Feb. 19, 1924.

H. L. HANSEN ET AL

POTATO LOADER

Filed Jan. 10, 1923

Witnesses:
F. L. Fox,
H. Berman

A. H. Voss,
H. L. Hansen
Inventor

Attorney

Feb. 19, 1924.
H. L. HANSEN ET AL
1,484,022
POTATO LOADER
Filed Jan. 10, 1923
3 Sheets-Sheet 2
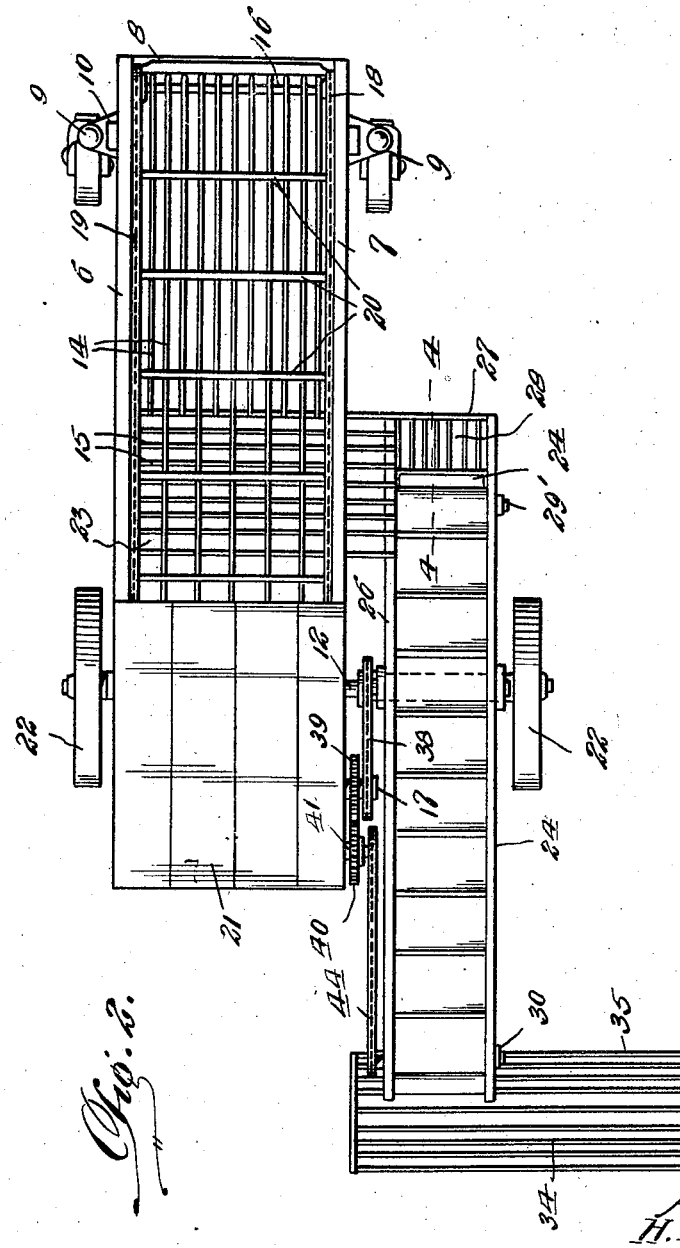
Fig. 2.
Witnesses:
F. L. Fox,
N. Berman
A. H. Voss,
H. L. Hansen,
Inventor
Attorney Feb. 19, 1924. 1,484,022
H. L. HANSEN ET AL
POTATO LOADER
Filed Jan. 10, 1923   3 Sheets-Sheet 3
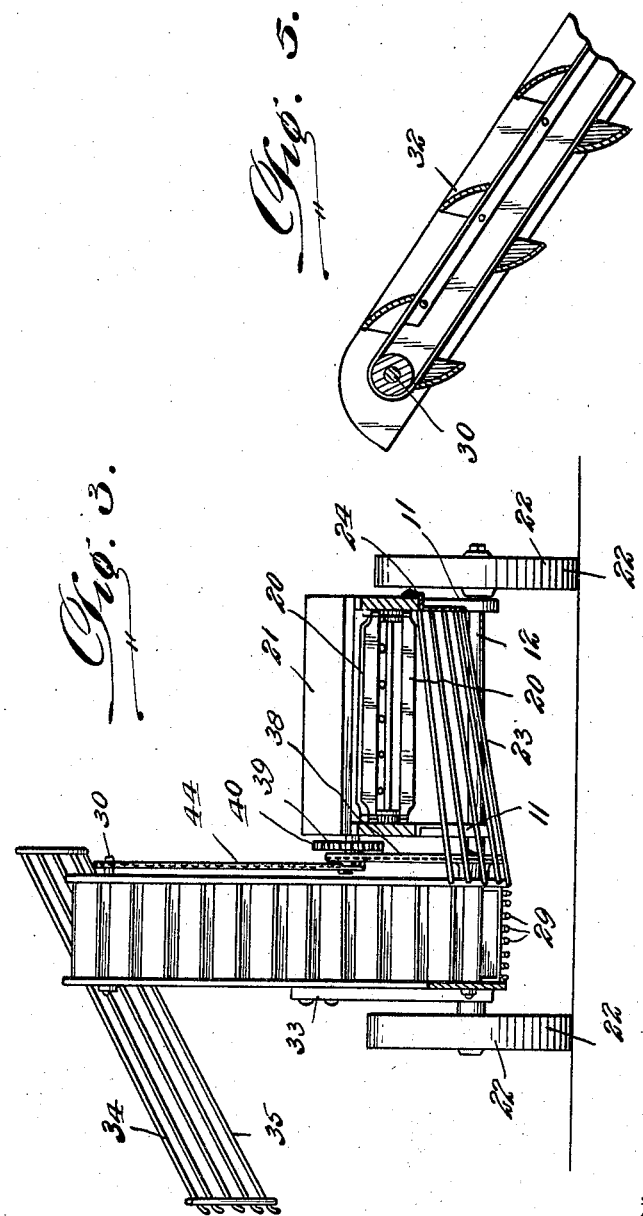
A. H. Voss,
H. L. Hansen,
Inventor Patented Feb. 19, 1924.

1,484,022

UNITED STATES PATENT OFFICE.

HANS L. HANSEN AND ALBERT H. VOSS, OF HEMINGFORD, NEBRASKA.

POTATO LOADER.

Application filed January 10, 1923. Serial No. 611,740.

*To all whom it may concern:*

Be it known that we, HANS L. HANSEN and ALBERT H. VOSS, citizens of the United States, residing at Hemingford, in the county of Box Butte and State of Nebraska, have invented certain new and useful Improvements in Potato Loaders, of which the following is a specification.

The primary object of our said invention is the provision of a potato loader, that is adapted for attachment to any conventional type of potato digger for loading the potatoes into a wagon or other means and in the act of conveying or loading the said potatoes from the digger to the wagon, these potatoes will be thoroughly separated from the soil.

A further object of the invention resides in the provision of such a device that is of comparatively simple construction, easy of operation and highly useful for the purpose intended.

The nature and advantages of the invention will be better understood when the following detailed description is read in connection with the accompanying drawings, the invention residing in the construction, combination, and arrangement of parts as claimed.

In the drawings, wherein like numerals of reference indicate similar parts in the several views and:

Figure 2 is a top plan view of the machine shown in Figure 1.

Figure 3 is a sectional view upon the line 3—3 of Figure 1.

Figure 4 is a fragmentary longitudinal sectional view upon the line 4—4 of Figure 2, and Figure 5 is a fragmentary cross sectional view of one end of the inclined elevator employed in conjunction with the present invention.

Figure 1:
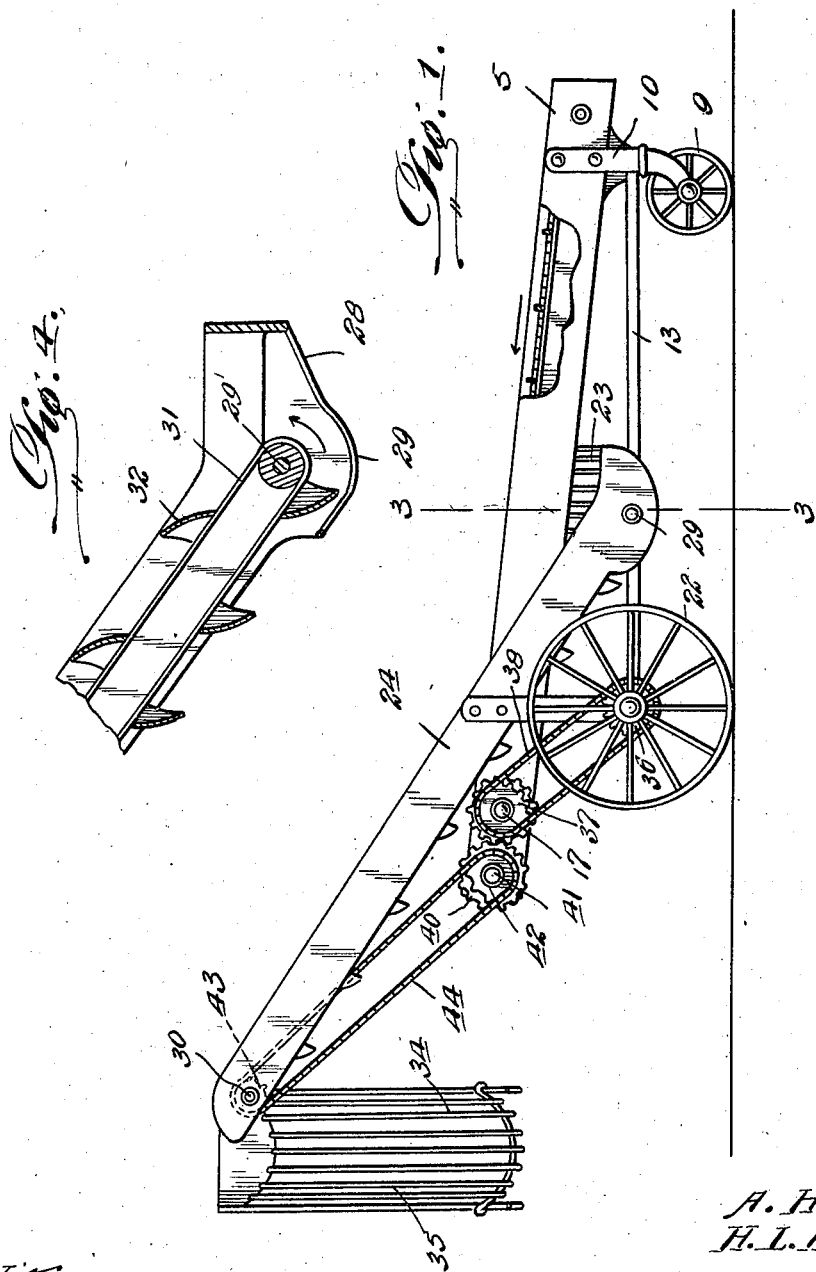
Figure 1 is a side elevational view of a potato loader constructed in accordance with the present invention, one side of the main conveying platform being broken away for more clearly disclosing the conveying means thereon.

Having particular reference to the drawings, our device includes the provision of a loading platform designated in general by the numeral 5. This platform consists of longitudinal side frame bars 6 and 7 joined at their front and rear ends by transverse bars 8. As more clearly shown in Figure 1, this platform is inclined upwardly towards its rear end, and is supported at its front end by caster wheels 9 carried by brackets 10 on the opposite frame bars 6 and 7 of the platform. Adjacent the rear end of this platform 5, the same is supported in a raised position by brackets 11 connected at one end to the longitudinal frame members 6 and 7 and engaging at their opposite end over a transversely extending axle 12. The platform 5 is further provided with longitudinal strengthening bars 13 as more clearly shown in Figure 1.

Between the frame bars 6 and 7 of the platform 5, and at the front end thereof, are spaced longitudinally extending screen bars 14, supported in any manner desirable between the said bars 6 and 7. Rearwardly of these screen bars 14, and also secured between the frame members 6 and 7 are other transversely extending spaced screen bars 15.

Journaled between the frame bars of the platform 5, and at the front and rear ends thereof, is a front and rear rotary shaft 16 and 17. Within the platform 5, and keyed to the opposite ends of each of these shafts are sprocket gears adapted to have trained thereover, sprocket chains 18 and 19, carried by these chains and extending transversely across the said platform 5 are spaced bars 20. At the rear end of the frame members 6 and 7, there is secured an attendant platform 21.

The before mentioned axle 12 at the rear end of the platform 5 has supporting wheels 22, at the opposite ends thereof, and one end of this axle 12 extends outwardly beyond one side of the said platform 5 for purposes hereinafter described. Beneath the transversely extending screen bars 15 of the platform 5 is an inclined hopper 23, this hopper consists of spaced bars as clearly shown in Figures 1, 2 and 3. The hopper 23 is supported at one end by a bracket 24 secured to the longitudinal frame bar 6 of the platform 5, and has communication at its lower opposite end with the lower end of an inclined elevator designated in general, by the numeral 24. This elevator 24 consists of side frame members 25 and 26 secured at their front ends by a cross member 27. The elevator 24 is of substantially the shape as shown in Figures 1 and 4, and adjacent the front end thereof, the same is provided with a hopper 28 consisting of spaced rods 29. Between the front and rear ends of the frame members 25 and 26, is journaled a front and rear shaft 29' and 30, and movable over these shafts is an endless belt 31, provided with spaced flights or buckets 32. The elevator 24 is supported at the side of the main platform 5 and upon the axle 12 by an arm 33, and the upper end of this elevator carries an inclined chute 34 also consisting of spaced rods or bars 35 suitably joined at their opposite ends.

Upon the front end of the platform 4, there may be provided any desired form of draft appliance for attaching the machine to a potato packer, whereby movement of the packer will occasion a movement of our potato loader.

As a means for conveying the potatoes rearwardly upon the platform 5 and thence upwardly by the elevator 24, there is keyed to the axle 12, a sprocket gear 36, and upon the adjacent end of the shaft 17 adjacent the rear end of the platform 5 is a similar sprocket gear 37, these sprocket gears adapted to have trained thereover, a sprocket chain 38. The shaft 17 also has keyed thereto inwardly of the sprocket gear 37, a spur gear 39, which spur gear has mesh with a similar spur gear 40 upon a stub shaft 41 upon the rear end of the frame bar 7 of said platform 5. This stub shaft 41 also has keyed thereto a sprocket gear 42, and upon the adjacent end of the top elevator shaft 30 is a relatively smaller sprocket gear 43 and trained over these gears 42 and 43 is a sprocket chain 44.

In view of the above description, it will at once be apparent that the potatoes which are thrown onto the front end of the platform 5 from the potato picker will be moved rearwardly thereon by the transverse cross strips 20 carried by the sprocket chains 18 and 19. Any soil that is thrown on to this platform will drop through the spaced longitudinal bars 14 and the potatoes engaging upon the transverse screen bars 15 will drop therethrough onto the hopper 23 to be thence conveyed upwardly by the endless conveyor 31. After reaching the upper end of this conveyor, the potatoes will then drop upon the chute 34 to be received within a wagon or the like, and in view of the spaced bar construction of the hopper 23 and chute 34, the potatoes will be further separated from any soil.

While we have herein shown and described the preferred embodiment of the present invention, it is nevertheless to be understood that minor changes may be made therein without departing from the spirit and scope of the invention as claimed.

What we claim as new is:—

A potato loader and sorter comprising a wheel mounted frame, spaced bars mounted upon the forward portion of the frame and being upwardly and rearwardly inclined, some of the said bars terminating at their rear ends at a line between the ends of the frame and other intervening bars extending rearwardly beyond the ends of the first mentioned bars, conveying means mounted for movement over all of the said bars, spaced bars located under the rear end portions of the longer first mentioned bars, the last mentioned bars being disposed transversely of the line of movement of the loader and being inclined downwardly beyond one side of the frame, an upwardly and rearwardly disposed trough communicating with the delivery end of the transversely disposed bars, a series of spaced rods located in advance of the forward end of the trough and disposed parallel with the line of movement of the loader, an elevator mounted for movement along the trough and a hopper disposed under the upper rear end of the trough and composed of spaced bars which are downwardly inclined from the delivery end of the trough, the bars of the hopper being disposed transversely of the line of movement of the loader and the delivery end of the hopper being disposed beyond the side and the outer surfaces of the supporting wheels of the frame.

In testimony whereof they affix their signatures.

HANS L. HANSEN.
ALBERT H. VOSS.